United States Patent
Skjelmose et al.

(10) Patent No.: US 12,155,220 B2
(45) Date of Patent: Nov. 26, 2024

(54) METHOD FOR IMPROVED POWER RAMPING IN A HYBRID POWER PLANT

(71) Applicant: VESTAS WIND SYSTEMS A/S, Aarhus N. (DK)

(72) Inventors: Mads Rajczyk Skjelmose, Risskov (DK); Henrik Møller, Egå (DK); Kouroush Nayebi, Ikast (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 42 days.

(21) Appl. No.: 17/914,704

(22) PCT Filed: Mar. 5, 2021

(86) PCT No.: PCT/DK2021/050068
§ 371 (c)(1),
(2) Date: Sep. 26, 2022

(87) PCT Pub. No.: WO2021/190718
PCT Pub. Date: Sep. 30, 2021

(65) Prior Publication Data
US 2023/0411966 A1    Dec. 21, 2023

(30) Foreign Application Priority Data
Mar. 26, 2020    (DK) .......................... PA 2020 70190

(51) Int. Cl.
*H02J 3/46*    (2006.01)
*H02J 3/38*    (2006.01)

(52) U.S. Cl.
CPC ............... *H02J 3/46* (2013.01); *H02J 3/381* (2013.01); *H02J 2300/28* (2020.01)

(58) Field of Classification Search
CPC ........... H02J 3/46; H02J 3/381; H02J 2300/28
(Continued)

(56) References Cited

U.S. PATENT DOCUMENTS

| 2008/0143304 A1* | 6/2008 | Bose .................. H02J 3/06 323/205 |
| 2012/0323396 A1 | 12/2012 | Shelton et al. |
| 2015/0094870 A1 | 4/2015 | Fornage et al. |

FOREIGN PATENT DOCUMENTS

| EP | 2733810 A2 | 5/2014 |
| EP | 2733812 A2 | 5/2014 |

(Continued)

OTHER PUBLICATIONS

Danish Patent and Trademark Office, 1st Examination including The Search Report and Search Opinion for Application PA 2020 70190 dated Sep. 4, 2020.

(Continued)

*Primary Examiner* — Richard Tan
(74) *Attorney, Agent, or Firm* — Patterson + Sheridan, LLP

(57) ABSTRACT

The invention relates to a method for providing power ramp rate control of a hybrid power plant with a plurality of energy assets including wind turbine generators and possibly solar power units, and an energy storage unit. Each energy asset has a ramp rate capability defined as the highest possible ramp rate at a given time, and the method includes receiving from each energy asset the corresponding ramp rate capability, and taking into account the ramp rate capabilities from the energy assets when calculating the power setpoint to each energy asset, so as to improve the power ramp rate control of the hybrid power plant.

17 Claims, 8 Drawing Sheets

(58) Field of Classification Search
USPC .......................................................... 307/24
See application file for complete search history.

(56) References Cited

FOREIGN PATENT DOCUMENTS

| | | |
|---|---|---|
| EP | 3703213 A1 | 9/2020 |
| EP | 3703216 A1 | 9/2020 |
| WO | 2017062910 A1 | 4/2017 |
| WO | 2019120396 A1 | 6/2019 |
| WO | 2019210920 A1 | 11/2019 |
| WO | 2020011320 A1 | 1/2020 |
| WO | 2021190718 A1 | 9/2021 |

OTHER PUBLICATIONS

PCT, Notification of Transmittal of The International Search Report and The Written Opinion of The International Searching Authority, or The Declaration for Application PCT/DK2021/050068 dated Jun. 8, 2021.

* cited by examiner

METHOD FOR IMPROVED POWER RAMPING IN A HYBRID POWER PLANT

FIELD OF THE INVENTION

The present invention relates to a method for improved power ramping in a hybrid power plant, a corresponding hybrid power plant, a corresponding power plant controller for a hybrid power plant, and a corresponding computer program product for application in control of a hybrid power plant.

BACKGROUND OF THE INVENTION

Recently, various kinds of renewable energy are gaining increased success in countries around the world to produce electricity for the electrical grid due to the gradual transition to a non-fossil based energy system taking place, but electrical grids also have requirements for such an integration of renewable energy to be effective. Within this technical area, the electrical grid may also be denoted the power grid or the electrical power grid, or even sometimes for short just the grid, the technical meaning being the same i.e. an interconnected electrical power system for delivering electricity as the skilled person will readily understand.

For example, the high penetration of wind turbines, or wind turbine generators (WTG) in the following, in the electrical grids has motivated requirements for the wind turbine generators on how they should contribute to the stability of the electrical grids. Such requirements are included in so-called grid codes defined by the transmission system operator (TSO), which the wind power plants, sometimes called wind farms, must comply with for producing power to the electrical grid.

Recently, there is an emerging trend to integrate various renewable energy sources into a so-called hybrid power plant with a plurality of energy assets i.e. with several power generating units, such as wind turbines generators and solar power units, together with an energy storage system, such as a large battery. Expectations are set at a high reliability of power produced from a hybrid power plant because of the possible complementary nature of the wind and solar sources of energy, e.g. the sun may not be shining in the evening, when the winds are relatively strong.

Some of the requirements, which may be included in the grid codes, include limits for the rate of changes of the power delivered to the grid, so-called power ramp rates, sometimes also called the ramping rate. Thus, the grid code may prescribe limits for ramp rates for a power plant (a maximum ramp rate and/or a minimum ramp rate) e.g. the power plant must be able to ramp up the power with a rate no less than a prescribed rate. These requirements are expectantly also imposed on future hybrid power plants, and it is therefore important to be able to deliver energy according to the grid codes for such hybrid power plants, too.

EP 3 026 774 discloses for example a method for the control of power ramp rates minimizing energy storage requirements in hybrid power generation plants, such as for example a photovoltaic solar plant, which minimizes the energy storage requirements approximately halving the size of storage systems necessary to comply with a maximum allowable ramp rate given by a grid code regulation regarding the state of the art, reducing thus investment costs in the power plant and/or carrying out a rationalized use of the energy storage system, in such a way that in order to achieve the same maximum fluctuation ramp, a minor use is done of the energy storage system, minimizing the losses and extending its working life, and therefore reducing the plant operational costs.

However, an improved method for controlling the ramp rate in a hybrid power plant would be advantageous, and in particular a more efficient and/or reliable method for ramp rate control in a hybrid power plant would be advantageous.

OBJECT OF THE INVENTION

It may be seen as an object of the present invention to provide a method for controlling ramp rate in a hybrid power plant that solves the abovementioned problems of the prior art with stability and/or response time.

SUMMARY OF THE INVENTION

Thus, the above described object and several other objects are intended to be obtained in a first aspect of the invention by providing a method for providing power ramp rate (RR) control of a hybrid power plant, the hybrid power plant being connected to an electrical grid, the hybrid power plant comprising a plurality of energy assets comprising:

a plurality of first energy assets, wherein the first energy assets comprise a wind turbine generator, at least one second energy asset, the second energy asset being different from a wind turbine generator, preferably said second energy asset comprise a solar power unit, and at least one third energy asset comprises an energy storage unit (ESU), preferably a battery energy storage system, wherein the hybrid power plant further comprises a power plant controller (PPC) arranged to communicate with said plurality of energy assets, the power plant controller being arranged to receive a power reference (P_ref) defining a power to be delivered to the electrical grid and calculating therefrom, and dispatching, a power setpoint (Pset_i) to each energy asset, each energy asset having an individual ramp rate (RR_i) which adds to a power ramp rate (RR) of the hybrid power plant, wherein each energy asset further has a ramp rate capability (RRC_i) defined as the highest possible ramp rate at a given time, and wherein the power plant controller (PPC) is arranged for:
1) receiving from each energy asset the corresponding ramp rate capability, and
2) taking into account the plurality of ramp rate capabilities from the energy assets when calculating the power setpoint (Pset_i) to each energy asset, so as to improve the power ramp rate (RR) control of the hybrid power plant.

The invention is advantageous for providing an improved control of power ramp rates of a hybrid power plant. Embodiments of the invention are particularly advantageous for providing a hybrid power plant with improved compliance with power ramp rates requested by the transmission system operator (TSO), for example in connection with changes in the power reference from the TSO e.g. during start-up of a hybrid power plant. Thus, simulations performed by the current inventors indicate that a stable and fast responding hybrid power plant can be obtained while at the same time optimising the power production.

In the context of the present invention, the term 'hybrid power plant' will be broadly understood as a power plant capable of producing power for the electric grid based on several sources of energy, for example wind energy, solar energy, hydro energy, thermal energy, etc., in the sense that the hybrid power plant has a mixture of energy sources producing power. It is to be understood that the hybrid power plant will be controlled collectively at some overall level of control to produce power, which—in the present context—is called a power plant controller (PCC). The various energy assets may, additionally or alternatively, have some degree of local control, e.g. a slave controller. It is also to be understood that the hybrid power plant may have a large geographical extent, e.g. the plurality of energy assets may be scattered at several locations, for example up to 2, 5, 10, 15 or 20 km, or even longer, apart, as long as the power plant controller is capable of provide some degree of overall level of control of the energy sources.

In the context of the present invention, the plurality of first energy assets comprises a wind turbines generator, typically a plurality of wind turbine generators, a wind turbine generator (WTG) may comprise a tower and a rotor with at least one rotor blade, such as three blades. The rotor may be connected to a nacelle, which is mounted on top of the tower and being adapted to drive a generator situated inside the nacelle. The rotor is rotatable by action of the wind. The wind induced rotational energy of the rotor blades is transferred via a shaft to the generator. Thus, the wind turbine generator is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid. The plurality of wind turbine generators may different, or they may be of the same kind.

In the context of the present invention, the second energy asset may comprise a plurality of solar power units, which each solar power unit may have e.g. a photovoltaic (PV) solar panel, a concentrated solar power (CSP) unit, or other solar power units capable of utilising the solar radiation and converting it to electrical power.

In the context of the present invention, the energy storage unit is to be understood broadly as a unit capable of storing energy e.g. from the first and/or second energy assets generating power during period of surplus energy, and then store the energy for some period of time until the need arise for the energy to be supplied into the electrical grid. In general, the first and second energy assets may be renewable in the sense that they rely on renewable sources of energy, which is replenishable on a human timescale, for example from sun, wind, rain, tidal, wave, and/or geothermal sources.

In general, the energy storage unit may be used to store energy from the grid as well, in periods when energy is cheap and release it to the grid when energy is expensive. Thus, it will be understood that for a hybrid power plant to rely on the energy storage unit, the stored energy may be of a certain minimum size to be of any significant use at a later time. Thus, it is considered that a minimum amount of energy of 0.5 MWh, 1 MWh, 2 MWh, 3 MWh, 4 MWh, or 5 MWh, is to be stored by the energy storage unit. Similarly, the power supplied to the electrical grid may be capable of a certain minimum power, for example at least 0.5 MW, 1 MW, 2 MW, 3 MW, 4 MW, or 5 MW, to have an impact on the hybrid power plant complying with the relevant grid codes for power production. Alternatively, the ratio of the energy storage unit power to the total power of the hybrid power plant may be minimum 1%, 2%, 3%, 4% or 5% to have an impact on the electrical grid. Alternatively, the ratio of the energy storage unit power to the total power of the hybrid power plant may be maximum of 20%, 15%, 10%, 8%, 6%, 4% or 2% because the energy storage unit is typically the most expensive energy asset, either at a given moment or averaged over some period of time.

Suitable energy storage units may preferably be based on electrochemical storage, such as a battery energy storage system (BES or BESS), more preferably including rechargeable Lithium ion batteries (LIB), but other energy storage units are also contemplated within the present invention, for example based on mechanical storage (e.g. compressed air reservoirs and elevated storage of fluids such as water), electrical storage (e.g. so-called supercapacitors), thermal energy storage, or chemical energy storage (e.g. power-to-gas P2G, electrolysis for producing hydrogen or other chemicals for storing energy), or other energy storage means suitable for power plant energy storage and subsequent power delivery to the electrical grid. When the energy storage unit is not based on electrical storage of energy, e.g. compressed air or thermal storage, the skilled person will understand that a state of charge (SoC) may be meant as a measure of the amount of energy available from the energy storage unit relative to the storing capacity of the energy storage unit.

Likewise, in the context of the present invention, the first energy asset may comprise one or a plurality of wind turbine generators (WTGs), and in case of plurality of WTGs, each wind turbine generator may be considered an energy asset i.e. a plurality of first energy assets. The wind turbine generators may then again have shared or common characteristics, for example a plurality of very similar or identical wind turbine generators in a large wind turbine generator array or wind farm. Similarly, a second of the energy assets may comprise a plurality of solar power units. These solar power units may then again have shared or common characteristics, for example a plurality of very similar or identical solar power unit, e.g. PV units, in a large solar array.

Available power is to be understood as the power, which the energy assets are able to produce. The available power may change over time. For a wind turbine generator, it may depend on the wind speed and/or direction and for a solar power unit, it may be dependent on the solar irradiance.

Additionally, or alternatively, the hybrid power plant may comprise a second energy being different from first energy asset in the sense that the second energy asset may be utilising another kind of renewable energy relative to the first renewable power generating unit, such as solar energy, more preferably said second energy asset comprises a plurality of solar power units as defined above, e.g. a photovoltaic (PV) solar panel unit, a concentrated solar power (CSP) unit, or other solar power units capable of utilising the solar radiation and converting it to electrical power.

In one embodiment, the power plant controller (PPC) may be taking into account the available power (P_avail) from each of the energy assets when calculating the power setpoint (Pset_i) to each energy assets so as to improve the power ramp rate (RR) control of the hybrid power plant (100). Thus, in this way it not just the highest possible slope of power, but—in some cases—also the actually obtainable power from the assets i.e. the highest possible value.

In another embodiment, the power plant controller (PPC) may have a desired power ramp rate (RR_target) to be delivered to the electrical grid, the power plant controller further performing a comparison between the desired power ramp rate (RR_target) to be delivered and the present ramp rate (RR) from the hybrid power plant, the comparison may also be applied when taking into account said ramp rate capability of each energy assets and for calculating the power setpoint (Pset_i) to each energy asset. Thus, in this way it may be possible to have, for example, a control loop for a hybrid power plant and a corresponding power plant controller (PPC) with more iterations for even further improved stability and control of the ramp rate. In some embodiments, the desired power ramp rate (RR_target) be can calculated internally in PPC or be received—directly or indirectly—from a transmission system operator (TSO) or a corresponding entity in relation to the electrical grid. Preferably, the power plant controller (PPC) may have the desired power ramp rate (RR_target) to be delivered to the electrical grid, said desired power ramp rate (RR_target) may optionally comprise a measure indicative of:

a. a minimum value of the desired power ramp rate (RR_target),
b. a maximum value of the desired power ramp rate (RR_target), and/or
c. an interval of the desired power ramp rate (RR_target), Moreover, the power plant controller (PPC) may take the plurality of ramp rate capabilities (RRC_i) from the energy assets into account by compensating a first sub-group of energy assets delivering power with no, or insufficient, ramp rate capability in relation to the desired power ramp rate (RR_target),
with a second sub-group of energy assets having an excess ramp rate capability in relation to the desired power ramp rate (RR_target)

when calculating the power setpoint (Pset_i) to each energy asset.

Thus, advantageously some extra or excess ramp rate capability (RRC) is used to make it up for the other energy assets having no or limited RRC, the effect is faster and improved delivering of the target ramp rate. Thus may be important for frequency control and/or grid stability. For example, when a hybrid power plant is starting up power production it may take some time for the wind turbine generators to start up their power production, as it will be illustrated in the below detailed description of the present invention.

Additionally, the power setpoint (Pset_i) to the said second sub-group of energy assets may be calculated according to pre-defined prioritizing distribution scheme, or a proportional distribution scheme according to the ramp rate capability for each energy asset with excess ramp rate capability for even faster and improved delivering of the target ramp rate.

In advantageous embodiments of the method, the power plant controller (PPC) may be further:

3) receiving from each energy asset a signal regarding a limit, such as state of charge limit of a battery energy storage system, SoC_limit, and/or a power production limit of one or more wind turbine generators, P_WTG_limit, of the energy asset being approached, said limit being related to:
  the ability to produce and/or absorb power,
  changing power output with a desired ramp rate (RR target) and/or
  a stable power output of the hybrid power plant, and
taking into account the plurality of said limits from the energy assets when calculating the power setpoint (Pset_i) for each energy asset.

Preferably, the power plant controller (PPC) may be further estimating, or predicting, a limit time (t_limit) when said limit is reached for each energy asset, and taking said limit time into account when calculating the power setpoint (Pset_i) for each energy asset, such as a linear time development, a polynomial time development, an exponential time development, etc.

Alternatively or additionally, the power plant controller (PPC) may be further compensating
  said first sub-group of energy assets before they reach their respective limits with
  said second sub-group of energy assets having excess ramp rate capability when calculating the power setpoint (Pset_i) to each energy asset, and thereby significantly improving the power ramp rate (RR) control of the hybrid power plant.

Preferably, the power plant controller may be compensating said first sub-group of energy assets before they reach their respective limits with said second sub-group of energy assets by gradually reducing the power output from said first sub-group of energy assets, and gradually increasing the power output from said second sub-group of energy assets, preferably the compensating is performed before said limit time is reached in a substantially continuous manner and/or in balanced manner between the said first and said second sub-group of energy assets so as to ensure a continuous ramp rate (RR) for the hybrid power plant to the extent required by a grid code of said electric grid, for example from a transmission system operator (TSO) or a corresponding entity in relation to the electrical grid Preferably, the limit of the energy asset being approached may be an inherent limit of the energy asset being substantially independent of external parameters or conditions, preferably the limit being related to the maximum energy storage capacity of the energy storage unit and/or a maximum power production capacity of the first and/or second energy assets.

Preferably, the limit of the energy asset being approached may be an external limit of the energy asset related to predicted, or expected, power production from said plurality of first energy assets and/or the second energy assets, preferably predicted from weather forecasts, more preferably local weather forecast or predictions for the location of the hybrid power plant. For hybrid power plants based on renewable energy in particular, the ability to use weather forecasts as input to control of the power production is yet another advantage.

In a second aspect, the invention relates to a hybrid power plant connected to an associated electrical grid for producing power to said electrical grid, the hybrid power plant comprising a plurality of energy assets comprising:
  a plurality of first energy assets, wherein the first energy assets comprise a wind turbine generator,
  at least one second energy asset, the second energy asset being different from a wind turbine generator, preferably said second energy asset comprise a solar power unit, and
  at least one third energy asset comprises an energy storage unit, preferably a battery energy storage system,
wherein the hybrid power plant further comprises a power plant controller (PPC) arranged to communicate with said plurality of energy assets, the power plant controller (PPC) being arranged to receive a power reference (P_ref) defining a power to be delivered to the electrical grid and calculating therefrom, and dispatching, a power setpoint (Pset_i) to each energy asset, each energy asset having an individual ramp rate (RR_i) which adds to a power ramp rate (RR) of the hybrid power plant,
wherein each energy asset further has a ramp rate capability (RRC_i) defined as the highest possible ramp rate at a given time, and
wherein the power plant controller (PPC) is arranged for:
  1) receiving from each energy asset the corresponding ramp rate capability, and 2) taking into account the plurality of ramp rate capabilities from the energy assets when calculating the power setpoint (Pset_i) to each energy asset, so as to improve the power ramp rate (RR) control of the hybrid power plant.

In a third aspect, the invention relates to a power plant controller for controlling an associated hybrid power plant connected to an associated electrical grid, the hybrid power plant being connected to an electrical grid, the hybrid power plant comprising a plurality of energy assets comprising:

a plurality of first energy assets, wherein the first energy asset comprise a wind turbine generator, at least one second energy asset, the second energy asset being different from a wind turbine generator, preferably said second energy asset comprise a solar power unit, and at least one third energy asset comprises an energy storage unit, preferably a battery energy storage system, the power plant controller (PPC) being arranged to communicate with said plurality of energy assets, the power plant controller (PPC) being arranged to receive a power reference (P_ref) defining a power to be delivered to the electrical grid and calculating therefrom, and dispatching, a power setpoint (Pset_i) to each energy asset, each energy asset having an individual ramp rate (RR_i) which adds to a power ramp rate (RR) of the hybrid power plant, wherein each energy asset further has a ramp rate capability (RRC_i) defined as the highest possible ramp rate at a given time, and wherein the power plant controller (PPC) is arranged for:
1) receiving from each energy asset the corresponding ramp rate capability, and
2) taking into account the plurality of ramp rate capabilities from the energy assets when calculating the power setpoint (Pset_i) to each energy asset, so as to improve the power ramp rate (RR) control of the hybrid power plant.

In a fourth aspect, the invention relates to a computer program product being adapted to enable a computer system comprising at least one computer having data storage means in connection therewith to control a hybrid power plant according to the second aspect of the invention, such as a computer program product comprising instructions which, when the program is executed by a computer, cause the computer to carry out the steps of the method of first aspect of the invention.

This aspect of the invention is particularly, but not exclusively, advantageous in that the present invention may be accomplished by a computer program product enabling a computer system to carry out the operations of the apparatus/system of the first aspect of the invention when down- or uploaded into the computer system. Such a computer program product may be provided on any kind of computer readable medium, or through a network.

The individual aspects of the present invention may each be combined with any of the other aspects. These and other aspects of the invention will be apparent from the following description with reference to the described embodiments.

BRIEF DESCRIPTION OF THE FIGURES

The invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
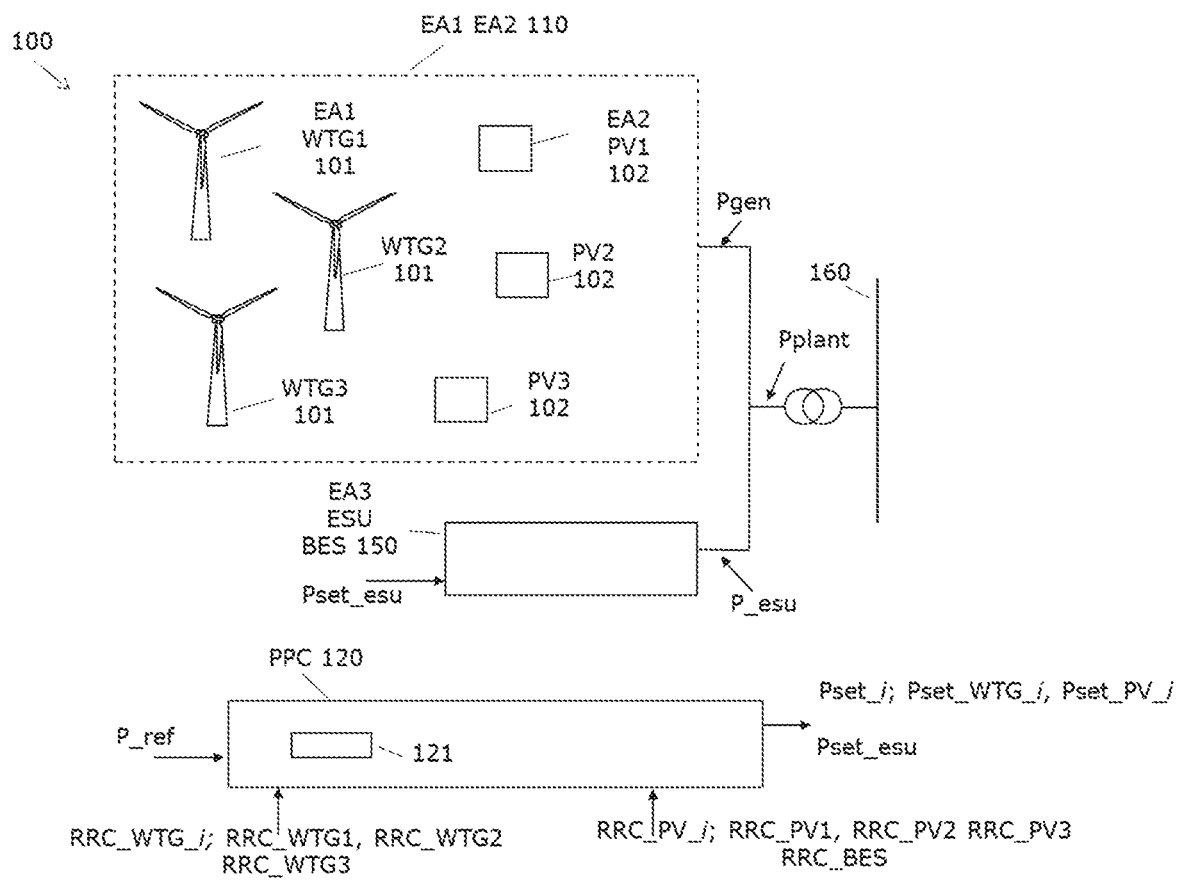
FIG. 1 shows a hybrid power plant including a plurality of first energy assets being wind turbine generators, a second energy asset being a plurality of solar power units, and a third energy asset being an energy storage unit.

FIG. 1 shows a hybrid power plant 100 which comprises a plurality of energy assets 110 including a plurality of wind turbine generators 101 being a first energy asset 1EA, in particular the schematically indicated three wind turbine generators WTG1, WTG2, and WTG, but of course any number of wind turbine generators are envisioned, and in particular a plurality of solar power units PV1, PV2, and PV3 being a second energy asset 2EA, but of course any number of solar power units are envisioned.

The hybrid power plant 100 further comprises an energy storage unit ESU, such as a battery energy storage system BES 150. The plurality of energy assets 110 i.e. 101 and 102 and the third energy asset 3EA i.e. the energy storage unit 150 is connected to an electrical power grid 160 for supplying power to the electrical power grid. The battery energy storage system 150 is controllable to charge or discharge dependent on a power setpoint Pset_esu.

In general, the power producing first 101 and second 102 energy assets may comprise different types of power generating units, e.g. different types of renewable power producing units such as solar power units 102 (e.g. photovoltaic solar panels) and wind turbines generators 101.

The hybrid power plant 100 is controlled by a central controller, often called a power plant controller PPC 120. The central controller 120 is arranged to control power generation from of the hybrid power plant 100 according to a power plant reference P_ref, which defines the desired power to be supplied to the electrical grid from the hybrid power plant 100. The central controller PPC 120 is arranged to dispatch power set points Pset_i to the power producing energy assets, i.e. individual power setpoints to each power producing energy asset 101 and/or 102, which sets the desired power productions.

Furthermore, the central controller PPC 120 is arranged to determine power setpoints Pset_esu to one, or more, battery energy storage systems 150 so that a given storage unit 150 can be controllable to charge or discharge with the power set by the power setpoint Pset_esu.

The power setpoints Pset_i, Pset_esu may be determined by the central controller PPC 120 dependent on the power plant reference P_ref so that the sum of power setpoints Pset_i, Pset_esu corresponds to the desired power plant reference P_ref.

Throughout this description, the term power reference is used for the demanded power for the hybrid power plant 100, whereas power setpoint is used for the demanded power for the individual power producing energy asset 101 and 102 and the electrical storage unit 150.

The wind turbine generator 101 may comprise a tower and a rotor with at least one rotor blade, such as three blades. The rotor is connected to a nacelle which is mounted on top of the tower and being adapted to drive a generator situated inside the nacelle. The rotor is rotatable by action of the wind. The wind induced rotational energy of the rotor blades is transferred via a shaft to the generator. Thus, the wind turbine generator is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid.

The wind turbines generators 101 and the other power producing units 102 are controllable to produce power corresponding to the power setpoint Pset_i provided by the central controller PPC 120. For wind turbines generators 101, the output power may be adjusted according to the power setpoint by adjusting the pitch of the rotor blades or by controlling the power converter to adjust the power production. Similar adjustment possibilities exist for the other power producing units 102.

Herein any reference to power such as power plant power, power set points Pset_i, produced power P_prod can define active, reactive or apparent power. According to an embodiment, said power is active power, e.g. P_ref, Pset_i, and P_prod refer to active power.

The hybrid power plant 100 of FIG. 1 is connected to the electrical grid 160, and the hybrid power plant comprising a plurality of energy assets:
- a plurality of first energy asset EA1 comprising in this embodiment a plurality of wind turbine generators WTG1, WTG2, and WTG3 (commonly indicated as reference 101) as indicated in FIG. 1,
- a second energy asset EA2 in this embodiment, the second energy asset being different from a wind turbine generator, in this embodiment the second energy asset comprises a plurality of solar power units PV1, PV2, and PV3 (commonly indicated as reference 102) as indicated in FIG. 1, and
- an energy storage unit ESU being a third energy asset EA3 in this embodiment, preferably a battery energy storage system BES 150, the energy storage unit being capable of storing energy from said first EA1 and second EA2 energy assets as commonly understood by the skilled person, and delivering power to said electrical grid when required, for example when the first and/or second energy asset cannot delivery sufficient power to the grid.

The energy storage unit ESU may—in the context of the present invention—also be called an energy storage system ESS, which may for example be a battery energy storage system BES, sometimes also abbreviated BESS in this technical field.

FIG. 1 also shows that the hybrid power plant comprises a power plant controller PPC 120 arranged to communicate with said plurality of energy assets EA1, EA2, and EA3, the power plant controller receiving a power reference P_ref defining the power to be delivered to the electrical grid 160 and calculating therefrom, and dispatching, a power setpoint Pset_i to each energy asset. The power reference may be provided by the transmission system operator TSO (not shown). Each energy asset has an individual ramp rate RR_i which adds, or contribute, to a power ramp rate RR of the hybrid power plant. Hence, in a simple form the total ramp rate RR of the hybrid power plant may be considered a mathematical summation of the ramp rates of the individual energy assets each with a ramp rate RR_i.

Figure 2A:
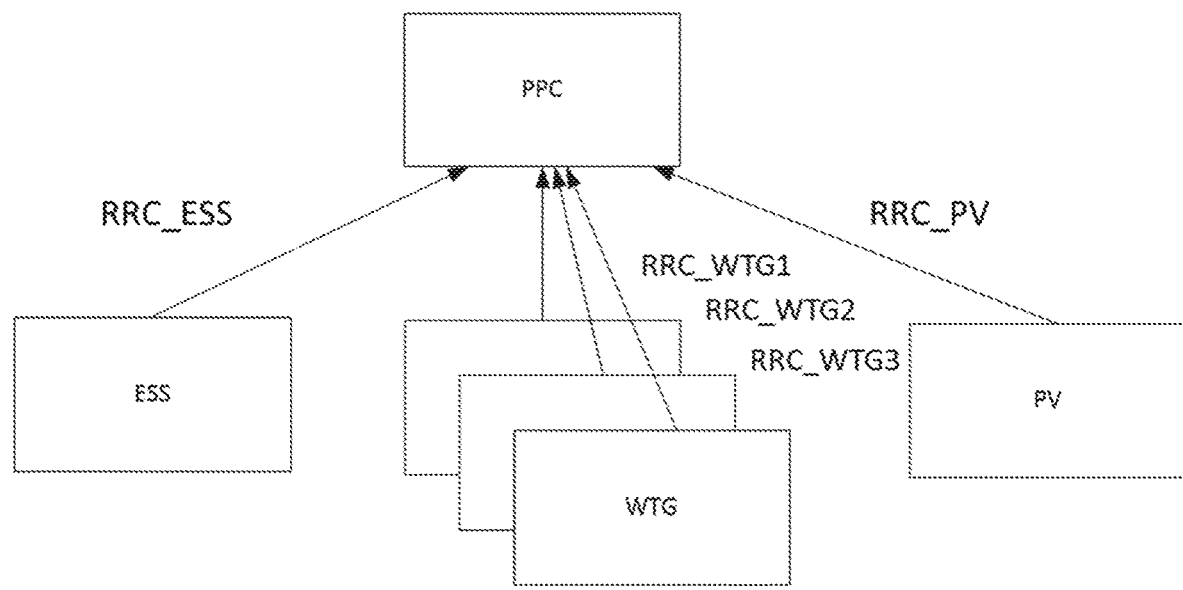
FIG. 2A shows schematically how the power plant controller receives ramp rate capabilities from the three energy assets with wind turbines generator, solar power units, and battery energy storage system, respectively.

FIG. 2A shows schematically how the power plant controller PPC receives ramp rate capabilities RRC from the three kind of energy assets, the wind turbine generators WTG, the solar power units PV, and (battery) energy storage system ESS, hence, each energy asset has a ramp rate capability RRC_i defined as the highest possible ramp rate at a given time, or within an interval of time. In this preferred embodiment, the ramp rate capabilities from the plurality of first energy assets EA1 i.e. the wind turbine generators 101 WTG1, WTG2, WTG3 schematically shown in FIG. 1, are communicated to the PPC as individual ramp rate capabilities, RRC_WTG1, RRC_WTG2 and RRC_WTG3, respectively, whereas the ramp rate capabilities from the solar power units 102 are communicated to the PPC as a sum of individual ramp rate capabilities, denoted RRC PV in FIG. 2A. Similarly, the ramp rate capabilities from the various sub-parts, or sub-units, of the (battery) energy storage system ESS are communicated to the PPC as a collective sum of individual ramp rate capabilities RRC ESS as indicated in FIG. 2A.

In other embodiments, this may be different, for example the ramp rate capabilities from the second energy asset EA2 i.e. the solar power units 102 PV1, PV2, and PV3 of FIG. 1, may be communicated to the PPC as individual ramp rate capabilities, RRC_PV1, RRC_PV2 and RRC_PV3, respectively, as also shown schematically in the lower part of FIG. 1. In yet other embodiments, the possibility of some degree of local control, for example with a slave controller of an energy asset, may favour that the ramp rate capabilities from an energy asset is communicated to the more central power plant controller PCC as a sum of ramp rate capabilities depending on the specific control method applied for the hybrid power plant.

It is to be understood that generally the ramp rate capability RRC_i may be defined as the numerical highest possible ramp rate at a given time. Thus, it can be both positive and negative, because grid stability also may require that in some situations a fast ramping down is performed for the hybrid power plant, and therefore of the energy assets EA1, EA1, and/or EA3.

Advantageously the power plant controller PPC 120 is therefore arranged for:
1) receiving from each energy asset the corresponding ramp rate capability RRC_i, and
2) taking into account the plurality of ramp rate capabilities RRC_i from the energy assets when calculating the corresponding power setpoint Pset_i to each energy asset, e.g. Pset_WTG_i (power setpoint for $i^{th}$ WTG), Pset_PV_i (power setpoint for each PV) and to the energy storage unit Pset_esu.

Thus, it thereby possible to improve the power ramp rate RR control of the hybrid power plant 100.

Advantageously, the power plant controller PPC, 120 has a desired power ramp rate RR_target to be delivered to the electrical grid, the power plant controller further performing a comparison in a dedicated controller 121 as shown in FIG. 1 between the desired power ramp rate RR_target to be delivered and the present ramp rate RR from the hybrid power plant 110. This comparison can also applied when taking into account said ramp rate capability of each energy assets and for calculating the power setpoint Pset_i to each energy asset.

It is to be understood that the embodiments of the present invention may be incorporated in existing control algorithms for a power plant controller PPC, this can be done by use of suitable sub-algorithms, or modification of existing algorithms, having as input such ramp rate capabilities RRC indicative of the highest possible slopes of the ramp rate.

Figure 2B:
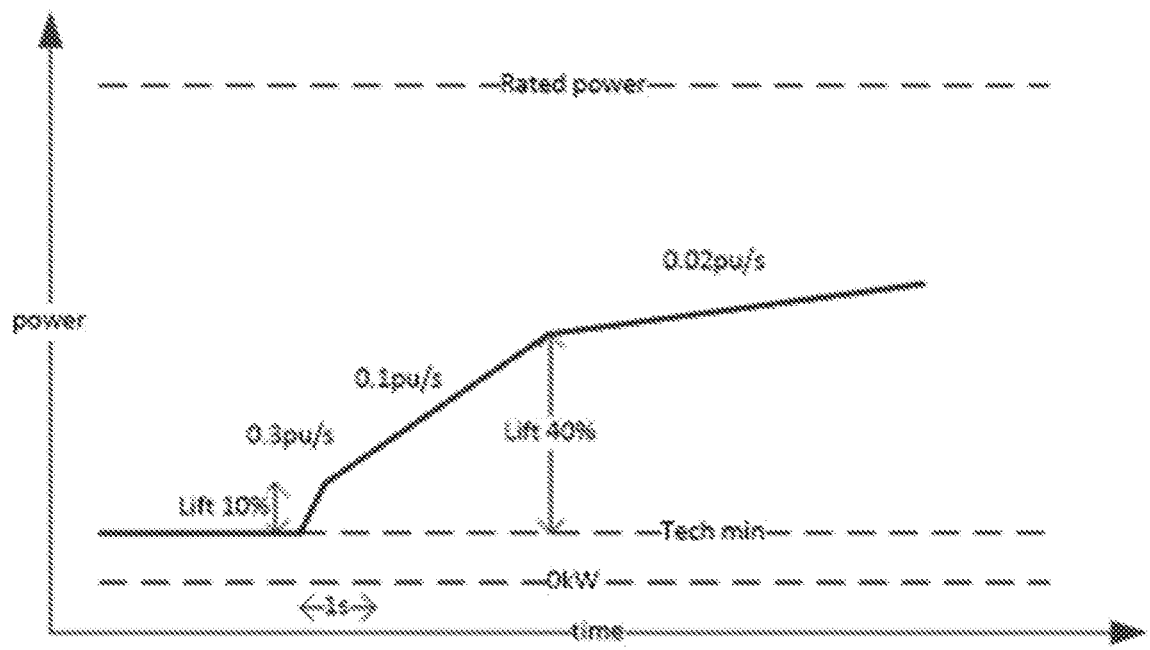
FIG. 2B shows a schematic example of the ramp rate capability of a wind turbine generator.

FIG. 2B shows a schematic example of the ramp rate capability of a wind turbine generator WTG illustrated as a power graph as a function of time. Initially, the WTG produces power at a constant lower limit 'Tech min', but at certain time the WTG has a highest possible ramp rate of 0.3 pu/s, i.e. a ramp rate capability RRC of 0.3 pu/s at a lift of 10% for a short period of time less than 1 second, whereas the WTG later has a highest possible ramp rate RRC of 0.1 pu/s and later again decreased to 0.02 pu/s as shown in the graph.

Figure 3:
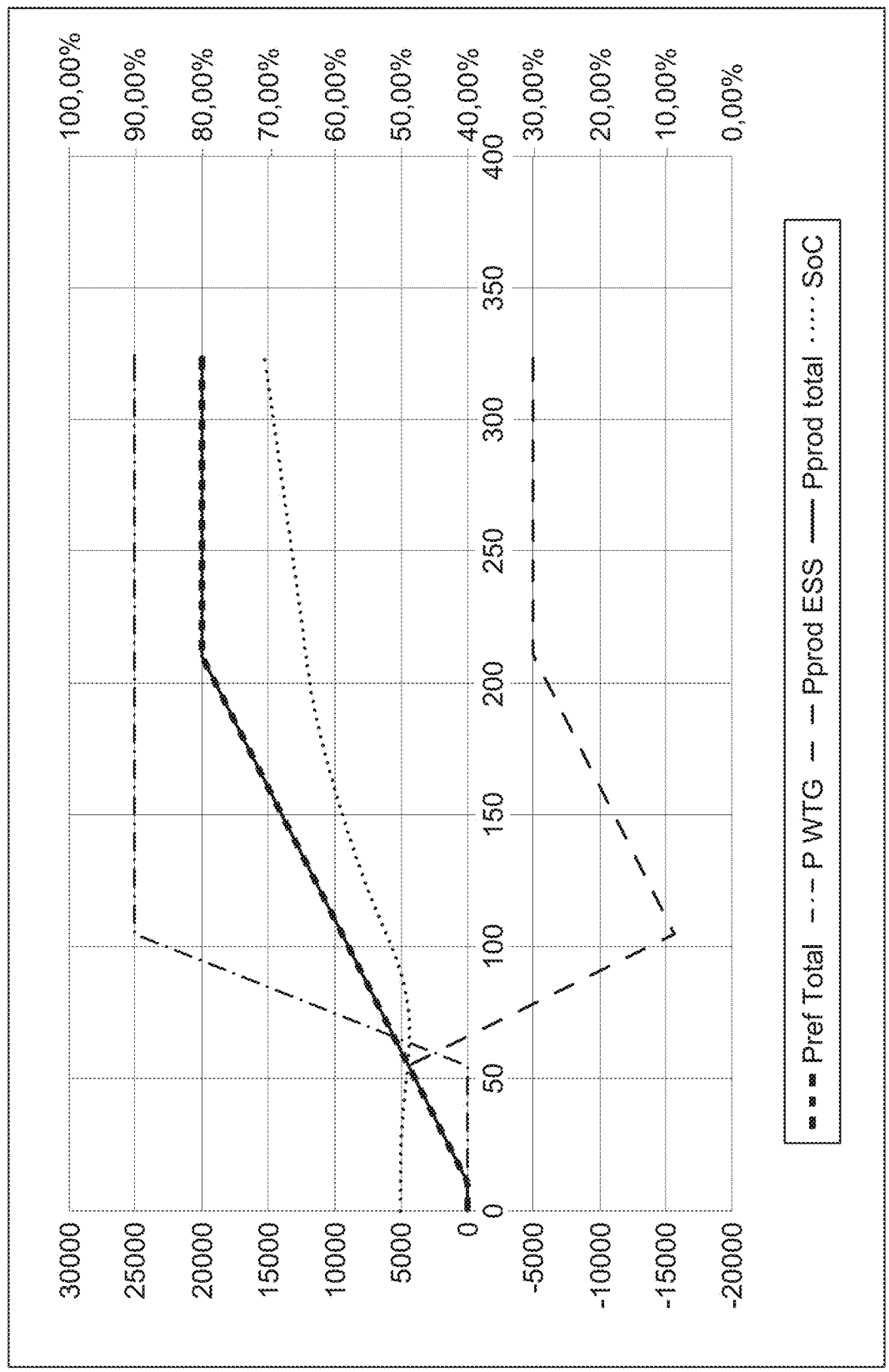
FIGS. 3 and 4 illustrates an embodiment of the invention using the ramp rate capabilities of the energy assets.
Figure 4:
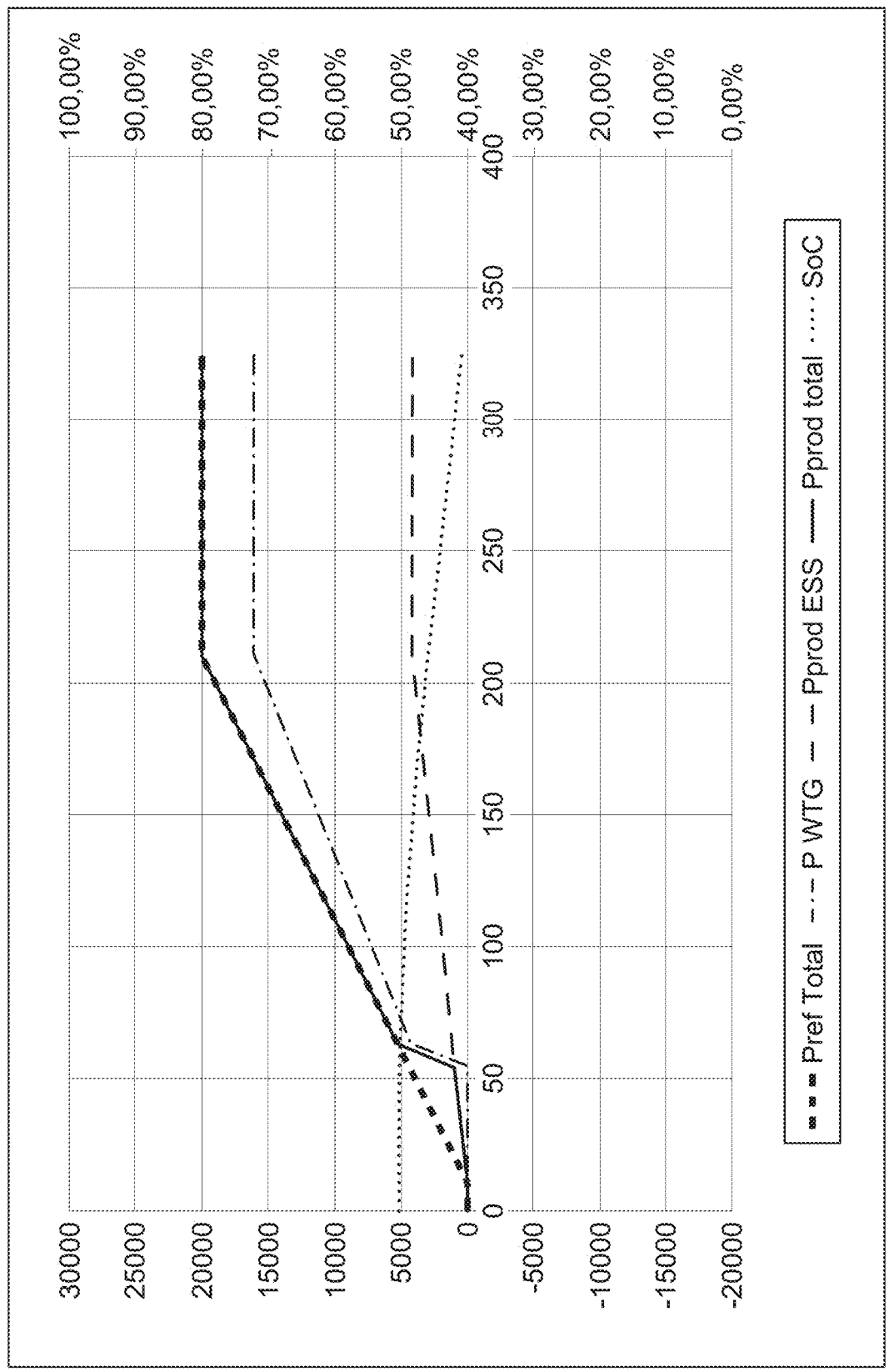

FIGS. 3 and 4 illustrates an embodiment of the invention using the ramp rate capabilities of the energy assets in a hybrid power plant in a graph with power in kW (kilo Wats) on the left vertical scale, and state-of-charge (SoC, dotted line) in percentage (%) of battery energy storage system BES on the right vertical scale. The time axis on the horizontal scale is in seconds.

In FIG. 3 initially at time zero, the power reference from the TSO is zero, some seconds later the TSO informs the hybrid power plant to ramp up to 20 MW with a prescribed ramp rate, either specified by the TSO or as required by the grid code. It can be seen that the power production increases as the hybrid power plant delivers the required power (Pprod_total follows completely P_ref total). In the beginning the energy storage system produces the entire power production. This is because the wind turbine generators WTG cannot produce yet (P_WTG grey line being zero) due to a startup delay of the turbines. It takes about 50 second for the turbines to start producing power. In another example, the lack of available power from an energy asset could for a wind turbine generator be due to limited wind and for solar power units (not shown in this embodiment) because of clouds. As mentioned after around 50 seconds, the WTG are starting to produce power as seen by the rising slope of P_WTG (grey line), and because the power plant controller therefore receives information about available power P avail from the WTGs and the corresponding ramp rate capability RRC, this is taken into account by the PPC when calculating the power setpoints to the energy assets; in this case the ESS is instructed to ramp down the energy production while the WTGs simultaneously start to produce power. At a point the WTGs can deliver more power than required by the TSO, the power is then used to charge the ESS thus, the WTGs will produce for both the grid and for storage on the ESS as indicated by the Pprod_ESS being negative when energy is stored and, correspondingly, the SoC starts to increase from a level below 50% to around 70% after more than 300 seconds in the graph. When the WTGs reach their production limit around 25,000 kW just after 100 seconds, the ESS is then charged with a lower ramp rate to allow the hybrid power plant to follow the desired ramp rate for the power reference. Just after 200 seconds, a power reference is reached and the total power production is therefore stable around 20,000 kW. The state of charge of the ESS is still rising as the additional power produced by the wind turbine generators is used for charging the ESS. It is to be understood that when the battery is fully charged then the power production of the wind turbine generators needs to be derated to comply with the power reference.

Thus, the idea is to utilize different ramp rate capabilities RRC of different energy assets EA1, EA2, and EA3 to achieve an optimal ramp of active power production on a plant level. This can be done by compensating active power set points with ramp rate capabilities RRC when dispatching setpoints between the energy assets. The invention uses ramp rate capability of the individual assets to achieve an accurate total or combined ramp rate capability of the hybrid power plant. To achieve the overall ramp rate requirement, the distribution of ramp rates between the different energy assets is performed based on knowledge of the ramp rate capabilities of the plurality of energy assets.

An example where the invention significantly provides an improvement over the prior art is where the inability of the wind turbine generators to ramp up during start up would normally have a negative effect of the hybrid power plants ability to follow the required ramp rate, cf. FIG. 3, where the invention is applied, and in FIG. 4, which is similar to FIG. 3, where the invention is not applied but shown because of comparison with the invention, leading to an inability to deliver the required power Pref_total, as seen by the Pprod_total (hashed line) been below the required power during the startup of the wind turbine generators for about 50 seconds, and the Pprod_total having a discontinuity just after 50 seconds, which may be problematic in relation to some grid codes.

Thus, generally the power plant controller PPC 120 according to the invention takes the plurality of ramp rate capabilities RRC_i from the energy assets into account by compensating
1) a first sub-group of energy assets, here initially WTGs during startup in FIG. 3, delivering power with no, or insufficient, ramp rate capability and available power in relation to a desired power ramp rate RR_target,
2) with a second sub-group of energy assets, here ESS during the WTG startup in FIG. 3, having an excess ramp rate capability in relation to the desired power ramp rate RR_target when calculating the active power setpoint Pset_i to each energy asset.

Figure 5:
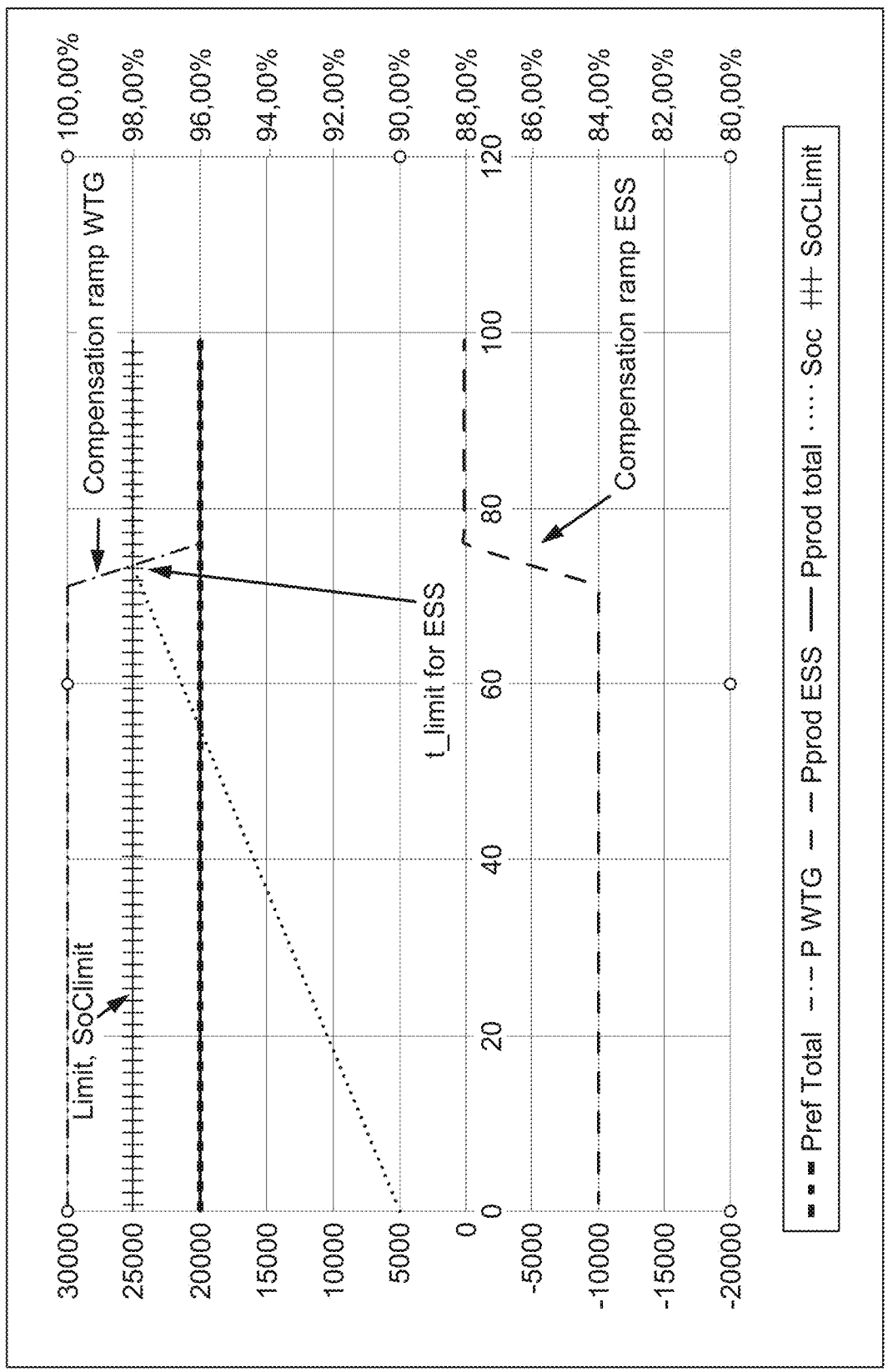
FIGS. 5, 6, and 7 illustrates another embodiment of the invention using the ramp rate capabilities of the energy assets also taking into account the limit of one, or more, energy assets.
Figure 6:
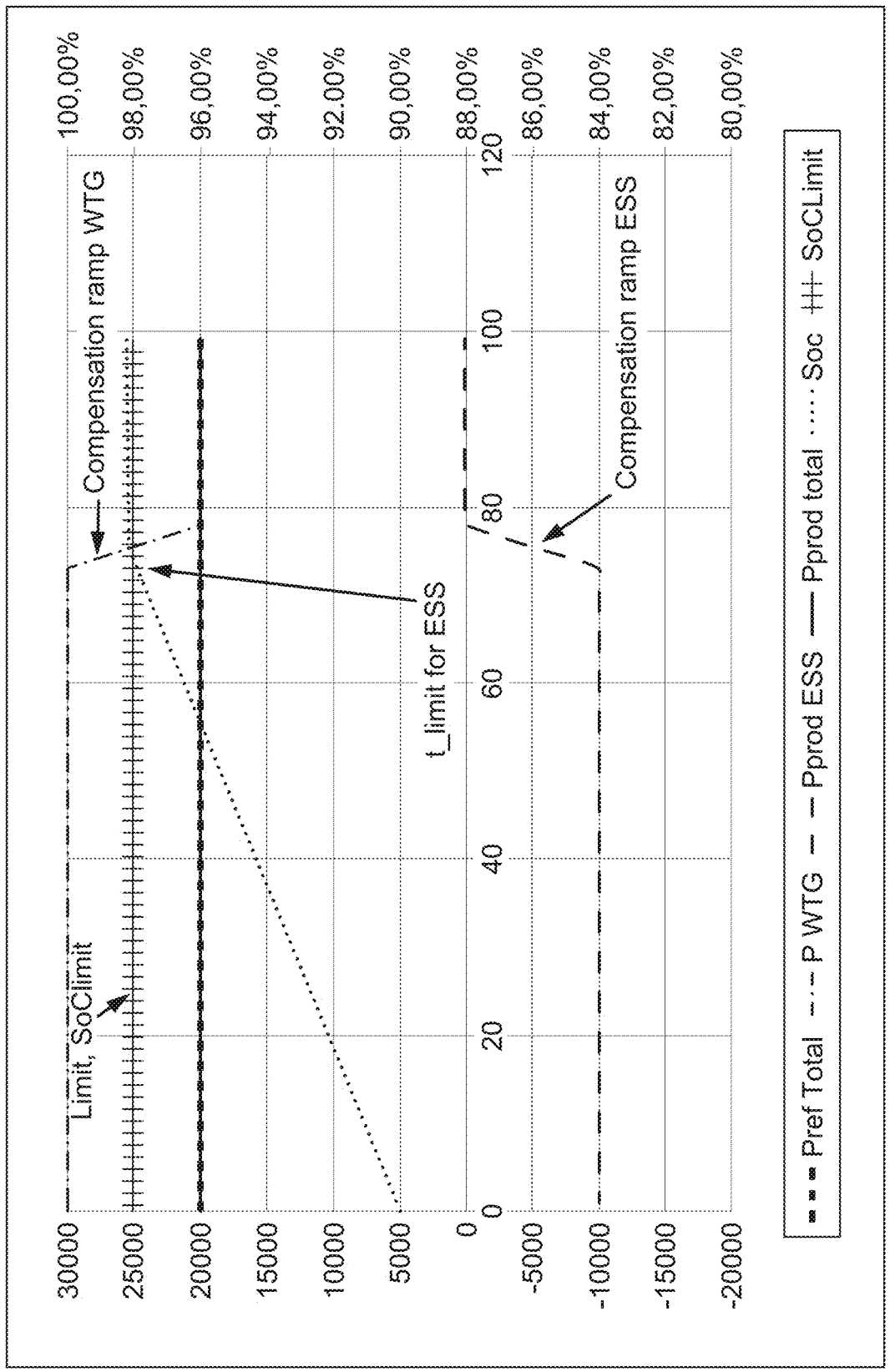
Figure 7:
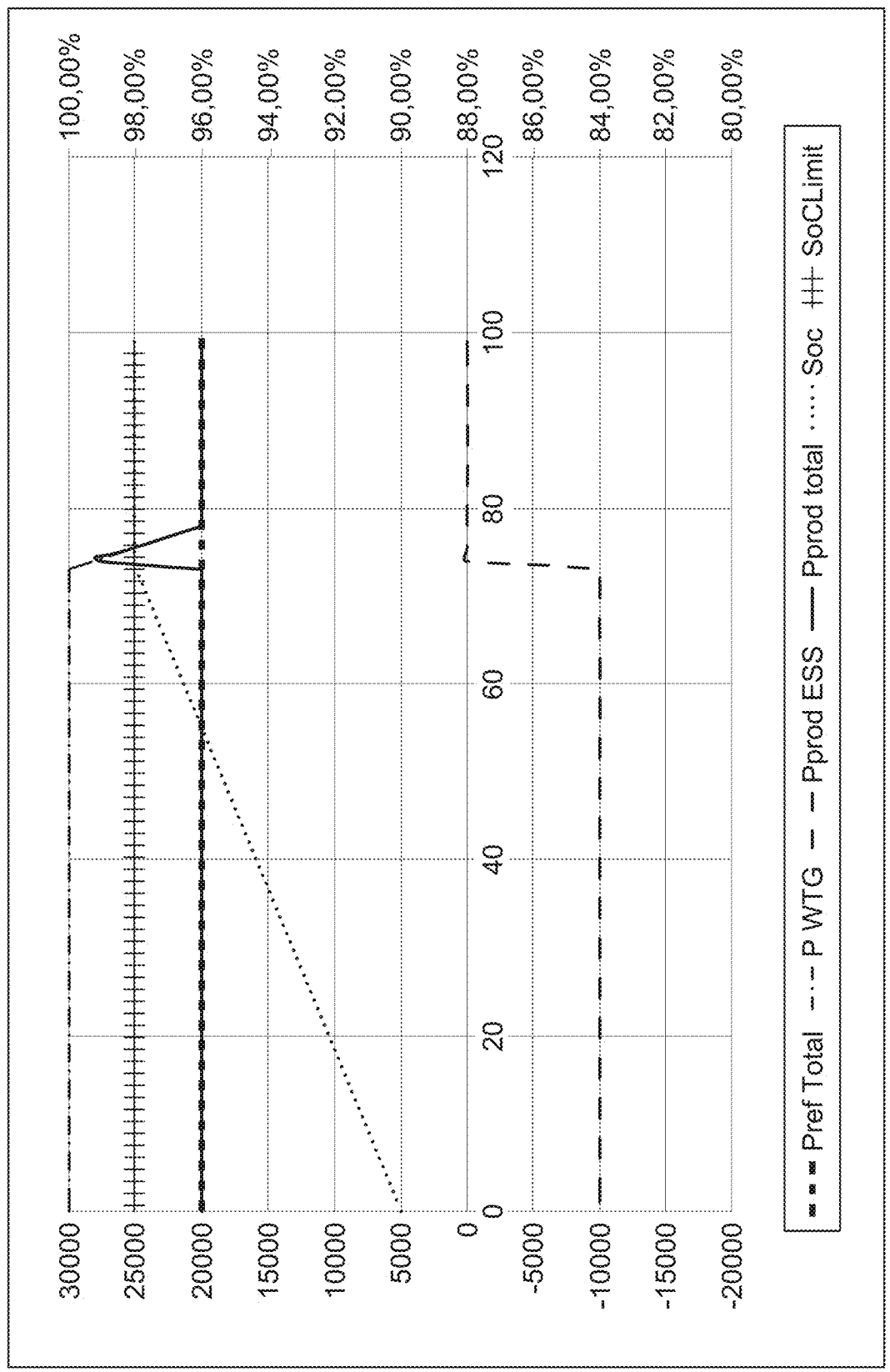

FIGS. 5, 6, and 7 illustrates another embodiment of the invention using the ramp rate capabilities of the energy assets also taking into account the limit of one, or more, energy assets similar to the embodiment of FIGS. 3-4, but in this embodiment limits of the energy asset, here a limit of energy storage system ESS, is also taken into account in addition to ramp rate capabilities RRC.

Thus, generally the power plant controller PPC 120 is further receiving from each energy asset a signal regarding a limit, e.g. a SoC_limit from the ESS or one, or more, P_WTG_limit from the wind turbine generators, of the energy asset being approached, said limit being related to:
the ability to produce, e.g. for a WTG or PV unit, or absorb power, e.g. of a battery,
changing power output with a desired ramp rate RR target and/or
a stable power output of the hybrid power plant, and
taking into account these limits from the energy assets when calculating the power setpoint Pset_i for each energy asset.

In this embodiment, the limit of ESS is being reached in that SoC_limit is being maximum, i.e. the battery system cannot store more energy within the given limit, however, in other embodiments, the limit could be production limit of a power producing unit, such as a maximum or a minimum limit.

The formula for total ramping capability may be defined as:

Total ramping capability=ΣRamp rate capability WTG+Ramp rate capability ESS+Ramp rate capability PV and the corresponding formula for ramping compensation when approaching or reaching limits may be given as:

Compensation ramp rate=min (ΣRamp rate capability WTG+Ramp rate capability PV; Ramp rate capability ESS)

A compensation ramp rate will then be used for gradually transferring setpoints between energy storage assets and power producing energy assets to achieve a substantially or approximately continuous, or smooth, transfer of production between storage and generation assets.

Based on the above compensation ramp rate, a compensation ramp time is calculated:

$$\text{Compensation ramp time} = \frac{Pess}{\text{Compensation ramp rate}}$$

Then energy consumption during ramping can be calculated as follows, assuming a linear ramping:

$$\text{Compensation ramp energy} = \frac{Pess * \text{Compensation ramp time}}{2}$$

With that a so-called 'Compensation ramp SoC trigger' can be found:

$$\text{Compensation ramp } SoC \text{ trigger} = SOC \text{ max limit} - \left(\frac{\text{Compensation ramp energy}}{\text{Total energy}} * 100\right)$$

The principle above also applies to energy assets like WTGs 101 and PV 102 shown in FIG. 1, when they reach a power limit due to predictable changing wind conditions and solar irradiation, or a user defined limit.

In the above example, a linear compensation ramp rate is assumed but of course other mathematical transitions may be readily envisioned for ensuring a smooth transition between the energy assets.

In FIG. 5, the WTGs are initially producing ca. 30,000 kW (grey line at the top of graph), which is more than the required power Pref_total, and hence the ESS is being charged (negative Pprod_ESS) in this case. However, as the ESS is being increasingly charged, the SoC is approaching the inherent limit of the ESS, called SoClimit in the graph, which causes the PPC according to the invention to take into account this situation and, before the limit is reached with respect to both time and SoC, starting a compensation ramp downwards for the WTGs and a corresponding upwards compensation ramp for the ESS in due time before the t_limit of the ESS can be predicted to be reached (under assumption of continued linear development). The two ramps are in a sense complementary because they balance each other to provide for constant power output of the hybrid power plant as in this case, but they may alternatively balance each other to provide a constantly changing power with a desirable constant ramp rate from the hybrid power plant.

FIG. 6 differs from FIG. 5 in that a state-of-charge limit trigger according to this embodiment is not active, and the result is a minor overcharging of the ESS above the SoClimit takes place as shown in FIG. 6. In some situations, such overcharging may be acceptable, though precautionary measures for the ESS should preferably be initiated, or in place.

FIG. 7, which is similar to FIGS. 5 and 6, illustrates another situation, where the invention is not applied but shown because of possible comparison with the invention, the graph displaying a sudden increase in Pprod_total (grey hashed line) when the ESS is fully charged, and the WTGs (full grey line) takes some time to ramp down their power production. The produced power from the hybrid power plant Pprod_total has a relatively sharp discontinuity, or power peak, just after approximately 70 seconds, which may be problematic in relation to some grid codes.

It should be noted that for an energy storage system ESS using a battery system, a maximum limit respecting the possible hysteresis of the battery system should preferably be defined. The hysteresis shall preferably prevent fast switching effect of the ESS, and possible damage therefrom.

Figure 8:
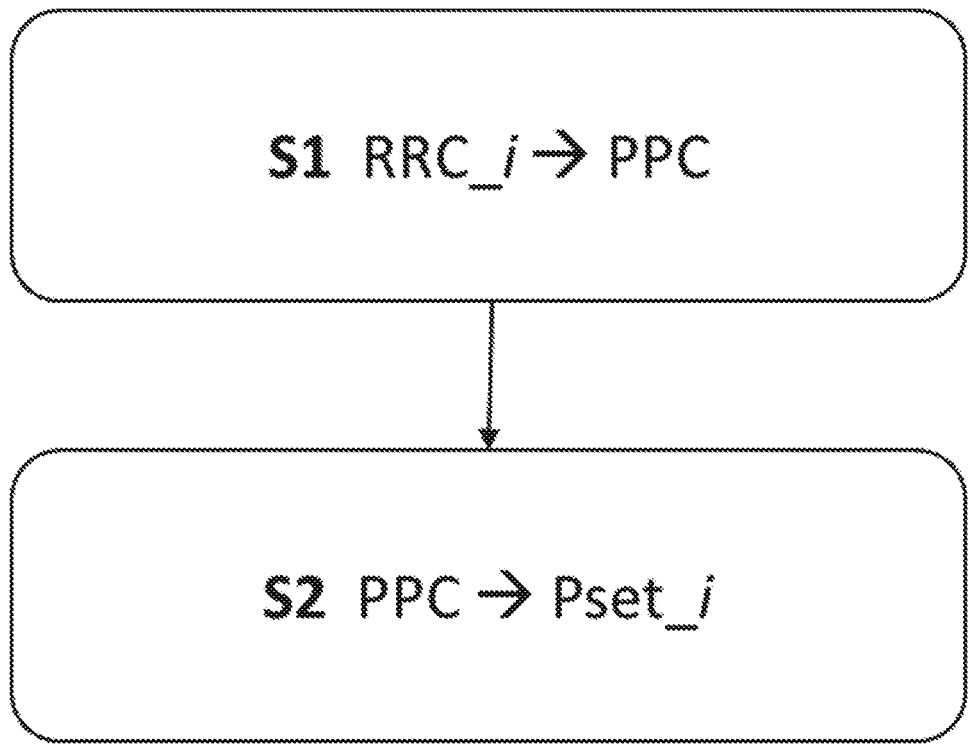
FIG. 8 is a schematic flow-chart representing an out-line of the operations of the method according to the invention.

FIG. 8 is a schematic system-chart representing an outline of/in detail the operations of the method according to the invention. Thus, the method for providing power ramp rate (RR) control of a hybrid power plant 100 as shown in FIG. 1, and the hybrid power plant further comprises a power plant controller PPC, 120 arranged to communicate with said plurality of energy assets EA1, EA2, EA3, the power plant controller being arranged to receive a power reference P_ref defining a power to be delivered to the electrical grid 160 and calculating therefrom, and dispatching, a power setpoint Pset_i to each energy asset, each energy asset having an individual ramp rate RR_i which adds to a power ramp rate (RR) of the hybrid power plant, wherein each energy asset further has a ramp rate capability RRC_i defined as the highest possible ramp rate at a given time, and wherein the power plant controller PPC, 120 is arranged for:

S1 receiving from each energy asset the corresponding ramp rate capability RRC_i, and S2 taking into account the plurality of ramp rate capabilities from the energy assets when calculating the power setpoint Pset_i to each energy asset, and thereby improve the power ramp rate (RR) control of the hybrid power plant 100.

The invention can be implemented by means of hardware, software, firmware or any combination of these. The invention or some of the features thereof can also be implemented as software running on one or more data processors and/or digital signal processors.

In short, the invention relates to a method for providing power ramp rate (RR) control of a hybrid power plant 100 with a plurality of energy assets EA1, EA2, EA3, as shown in FIG. 1, including wind turbine generators WTG1, WTG2, WTG3, and possibly solar power units PV1, PV2, PV3, 102, and an energy storage unit ESU. Each energy asset has a ramp rate capability RRC_i defined as the highest possible ramp rate at a given time, and, as shown in FIG. 2A, the method includes receiving from each energy asset the corresponding ramp rate capability, and taking into account the plurality of ramp rate capabilities from the energy assets when calculating the power setpoint Pset_i to each energy asset, so as to improve the power ramp rate RR control of the hybrid power plant 100.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for providing power ramp rate control of a hybrid power plant, the hybrid power plant being connected to an electrical grid, the hybrid power plant comprising a plurality of energy assets comprising:
  a plurality of first energy assets, wherein the plurality of first energy assets comprises a wind turbine generator;
  a second energy asset comprising a solar power unit; and
  a third energy asset comprising an energy storage unit,
  wherein the hybrid power plant further comprises a power plant controller arranged to communicate with said plurality of energy assets, the power plant controller being arranged to receive a power reference defining a power to be delivered to the electrical grid and calculating therefrom, and dispatching, a power setpoint to each energy asset, each energy asset having an individual ramp rate which adds to a power ramp rate of the hybrid power plant, wherein:
    each energy asset further has a ramp rate capability defined as a highest possible ramp rate at a given time; and
    the power plant controller is arranged for:
      receiving from each energy asset the corresponding ramp rate capability; and
      determining the power setpoint for the third energy asset based on the ramp rate capability of the plurality of first energy assets and the ramp rate capability of the second energy asset.

2. The method of claim 1, wherein the power plant controller is taking into account an available power from each of the energy assets when calculating the power setpoint to each energy asset so as to improve the power ramp rate control of the hybrid power plant.

3. The method of claim 1, wherein the power plant controller has a desired power ramp rate to be delivered to the electrical grid, the power plant controller further performing a comparison between the desired power ramp rate to be delivered and a present ramp rate from the hybrid power plant, said comparison being also applied when taking into account said ramp rate capability of each energy asset and for calculating the power setpoint to each energy asset.

4. The method of claim 3, wherein the power plant controller has said desired power ramp rate to be delivered to the electrical grid, said desired power ramp rate comprises a measure indicative of:
  a minimum value of the desired power ramp rate;
  a maximum value of the desired power ramp rate; and/or
  an interval of the desired power ramp rate.

5. The method of claim 3, wherein the power plant controller takes the ramp rate capabilities from the plurality of energy assets into account by compensating, when calculating the power setpoint to each energy asset, a first sub-group of energy assets delivering power with no or insufficient ramp rate capability in relation to the desired power ramp rate with a second sub-group of energy assets having an excess ramp rate capability in relation to the desired power ramp rate.

6. The method of claim 5, wherein the power setpoint to the second sub-group of energy assets is calculated according to a predefined pre-defined prioritizing distribution scheme or a proportional distribution scheme according to the ramp rate capability for each energy asset with excess ramp rate capability.

7. The method of claim 1, wherein the power plant controller is further arranged for:
  receiving from each energy asset a signal regarding a limit of the energy asset being approached, said limit being related to:
    an ability to produce or absorb power;
    changing power output with a desired ramp rate; or
    a stable power output of the hybrid power plant; and
  taking into account the plurality of said limits from the energy assets when calculating the power setpoint for each energy asset.

8. The method of claim 7, wherein the power plant controller is further arranged for estimating or predicting a limit time when said limit is reached for each energy asset, and taking said limit time into account when calculating the power setpoint for each energy asset.

9. The method of claim 5, wherein the power plant controller is further arranged for compensating said first sub-group of energy assets before the first sub-group of energy assets reach respective limits with said second sub-group of energy assets having excess ramp rate capability when calculating the power setpoint for each energy asset.

10. The method of claim 5, wherein the power plant controller is further arranged for compensating said first sub-group of energy assets before the first sub-group of energy assets reach respective limits with said second sub-group of energy assets by gradually reducing power output from said first sub-group of energy assets, and gradually increasing power output from said second sub-group of energy assets.

11. The method of claim 7, wherein the limit of the energy asset being approached is a limit of the energy asset being substantially independent of external parameters or conditions.

12. The method of claim 7, wherein the limit of the energy asset being approached is an external limit of the energy asset related to predicted or expected power production from said plurality of first energy assets or the second energy asset.

13. A hybrid power plant connected to an electrical grid for producing power to said electrical grid, the hybrid power plant comprising a plurality of energy assets comprising:
  a plurality of first energy assets, wherein the plurality of first energy assets comprises a wind turbine generator;
  a second energy asset comprising a solar power unit; and
  a third energy asset comprising an energy storage unit,
  wherein the hybrid power plant further comprises a power plant controller arranged to communicate with said plurality of energy assets, the power plant controller being arranged to receive a power reference defining a power to be delivered to the electrical grid and calculating therefrom, and dispatching, a power setpoint to each energy asset, each energy asset having an individual ramp rate which adds to a power ramp rate of the hybrid power plant, wherein:

each energy asset further has a ramp rate capability defined as a highest possible ramp rate at a given time; and the power plant controller is arranged for:

receiving from each energy asset the corresponding ramp rate capability; and determining the power setpoint for the third energy asset based on the ramp rate capability of the plurality of first energy assets and the ramp rate capability of the second energy asset.

14. A power plant controller for controlling a hybrid power plant connected to an electrical grid, the hybrid power plant comprising a plurality of energy assets comprising:

a plurality of first energy assets, wherein the plurality of first energy assets comprises a wind turbine generator;

a second energy asset comprising a solar power unit; and a third energy asset comprising an energy storage unit, the power plant controller being arranged to communicate with said plurality of energy assets, the power plant controller being arranged to receive a power reference defining a power to be delivered to the electrical grid and calculating therefrom, and dispatching, a power setpoint to each energy asset, each energy asset having an individual ramp rate which adds to a power ramp rate of the hybrid power plant, wherein each energy asset further has a ramp rate capability defined as a highest possible ramp rate at a given time, and wherein the power plant controller is arranged for:

receiving from each energy asset the corresponding ramp rate capability; and determining the power setpoint for the third energy asset based on the ramp rate capability of the plurality of first energy assets and the ramp rate capability of the second energy asset.

15. A computer program product which, when executed, configures a computer system having data storage to perform an operation for providing power ramp rate control of a hybrid power plant, the hybrid power plant being connected to an electrical grid and comprising a plurality of energy assets, including: a plurality of first energy assets including a wind turbine generator; a second energy asset exclusive of a wind turbine generator; and a third energy asset comprising an energy storage unit, and wherein the operation comprises:

receiving a power reference defining a power to be delivered to the electrical grid;

calculating from the power reference, and dispatching, a power setpoint to each energy asset, each energy asset having an individual ramp rate which adds to a power ramp rate of the hybrid power plant; wherein each energy asset further has a ramp rate capability defined as a highest possible ramp rate at a given time; and receiving from each energy asset the corresponding ramp rate capability, where calculating the power setpoint for the third energy asset is based on the ramp rate capability of the plurality of first energy assets and the ramp rate capability of the second energy asset.

16. The computer program product of claim 15, wherein the second energy asset comprises a solar power unit.

17. The computer program product of claim 15, wherein the third energy asset comprises a battery energy storage system.

* * * * *